Aug. 16, 1949.  J. H. DAWSON  2,479,324
ROASTING RACK FOR WIENERS
Filed July 27, 1948
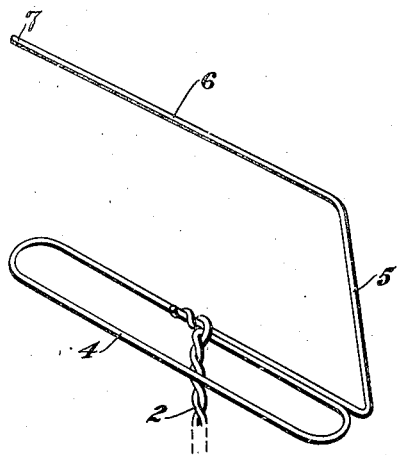
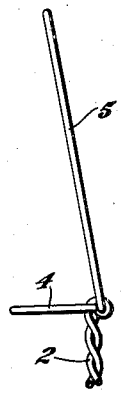
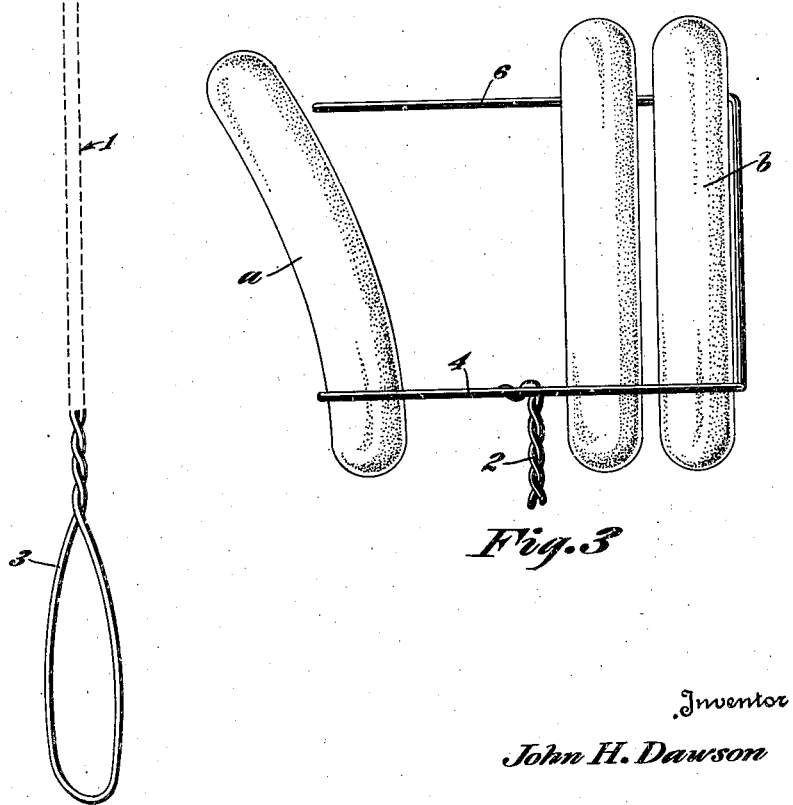
Inventor
John H. Dawson
By Mason, Fenwick & Lawrence
ATTORNEYS

Patented Aug. 16, 1949

2,479,324

UNITED STATES PATENT OFFICE 2,479,324

ROASTING RACK FOR WIENERS

John H. Dawson, Rockville, Md.

Application July 27, 1948, Serial No. 40,821

7 Claims. (Cl. 99—419)

This invention relates to a roasting rack for wieners.

The general object of the invention is to provide a roasting rack consisting of a handle portion having at its end a skewer on which a plurality of wieners may be impaled in side by side relation, and a loop adapted to embrace the group of wieners in a zone remote from the skewer, affording support for the wieners, regardless of which side of the group is turned to the fire.

Another object of the invention is to provide a roasting rack of the character described, in which the skewer lies in the medial longitudinal plane of the embracing loop, parallel to the axis of the handle portion so that either side of the group of wieners will be presented at the same angle to the fire when the handle portion is rotated about its axis.

A further object of the invention is the embodiment of a roasting rack for wieners as described, in the form of continuous bent wire construction.

Other objects of the invention will appear as the following description of a preferred and practical embodiment thereof proceeds.

In the drawing which accompanies the specification, and throughout the several figures of which the same reference characters have been used to denote identical parts:

Figure 1 is a perspective view of a roasting rack embodying the principles of the invention;

Figure 2 is an end elevation, most of the handle portion being omitted;

Figure 3 is a side elevation of the portion of the device illustrated in Figure 2, showing several wieners.

Referring now to a detailed description of the invention as shown, the roasting rack comprises a continuous stiff wire 1, twisted to form a sturdy shank 2, and having an open loop 3 at its low end, constituting a hand grip, said hand grip and shank being referred to as a handle portion, by means of which the roasting rack can be turned about the axis of the shank.

At the upper end of the shank 2 the wire is bent to form an elongated closed loop 4 in a plane perpendicular to the axis of the shank. The shank and one of the long sides of the loop 4 are in a common plane. The wire 1 has a portion 5 extended upwardly from the loop 4, adjacent one end of said loop, the free end of which portion 5 is transversely bent to overlie the loop 4 and form an impaling skewer 6. The free end 7 of the skewer 6 is sharp enough to penetrate wieners when pressed against it. The skewer 6 is preferably parallel to the longitudinal axis of the loop 4, and spaced from said loop a distance less than the length of a wiener, so that the loop can embrace the lower portions of wieners impaled upon said skewer. The latter preferably lies in the medial longitudinal plane of the loop 4, which is parallel to the axis of the shank 2 so that a flat group of wieners impaled on the skewer and embraced by the loop 4, will be axially parallel to the shank and presented at the same angle to the fire, on either side when the shank is rotated, facilitating even cooking of the wieners on both sides. The skewer 6 is preferably substantially coextensive in length with the loop 4.

In placing wieners in the roasting rack, one, indicated at *a* in Figure 3, is first positioned with its lower end in the loop 4, then impaled upon the skewer and pushed to the opposite end of the loop 4, as indicated at *b* in Figure 3. The others are similarly manipulated until the desired number have been introduced.

While I have in the above description disclosed a preferred and practical embodiment of the invention, it will be understood by those skilled in the art that the specific details and the construction and arrangement of parts, as shown, are by way of example and not to be construed as limiting the scope of the invention.

What I claim as my invention is:

1. Roasting rack for wieners comprising a handle portion including a shank, an elongated loop at the end of said shank transverse thereto having a width approximately the diameter of wieners that it is adapted to embrace, and a skewer extending longitudinally of said loop, spaced therefrom a distance less than the length of a wiener, having its free end adjacent one end of said loop.

2. Roasting rack for wieners comprising a handle portion including a shank, an elongated loop at the end of said shank lying in a plane perpendicular to the axis of said shank, having a width approximately the diameter of wieners that it is adapted to embrace, and a skewer extending lengthwise of said loop, parallel thereto and spaced therefrom a distance less than the length of a wiener, and having its free end adjacent one end of said loop.

3. Roasting rack for wieners comprising a handle portion including a shank, an elongated closed loop at the end of said shank lying in a plane perpendicular to the axis of said shank, having a width approximately the diameter of wieners that it is adapted to embrace, and a skewer extending lengthwise of said loop, parallel thereto and spaced therefrom a distance less than the length of a wiener, and having its free end adjacent one end of said loop.

4. Roasting rack for wieners comprising a handle portion including a shank, an elongated loop at the end of said shank lying in a plane perpendicular to the axis of said shank and offset to one side of said shank, having a width approximately the diameter of the wieners that it is adapted to embrace, and a skewer extending lengthwise of said loop parallel thereto and spaced therefrom a distance less than the length of a wiener, having its free end adjacent one end of said loop.

5. Roasting rack for wieners comprising a handle portion including a shank, an elongated loop at the end of said shank lying in a plane perpendicular to the axis of said shank adapted to embracingly support wieners, and a skewer extending lengthwise above said loop, spaced therefrom a distance less than the length of a wiener.

6. Roasting rack for wieners comprising a handle portion including a shank, an elongated loop adjacent the end of said shank lying in a plane perpendicular to said shank and of such width as to embracingly support wieners, and a skewer above said loop extending lengthwise thereof and spaced therefrom a distance less than the length of a wiener, said skewer lying in the medial longitudinal plane of said loop parallel to the axis of said shank.

7. Roasting rack for wieners comprising a handle, an elongated loop carried transversely by said handle having a width approximately that of the diameter of wieners that it is adapted to embrace, and a skewer carried by said handle extending longitudinally of said loop, spaced therefrom a distance less than the length of a wiener, and having a free end adjacent one end of said loop.

JOHN H. DAWSON.

No references cited.